Feb. 16, 1954  J. J. KELSCH  2,669,391
MIXING VALVE FOR WATER CLOSET TANKS
Filed July 12, 1950

Inventor:
John J. Kelsch
By Fetherstonhaugh & Kent
Their Atty's.

Patented Feb. 16, 1954

2,669,391

UNITED STATES PATENT OFFICE 2,669,391

MIXING VALVE FOR WATER CLOSET TANKS

John J. Kelsch, Winnipeg, Manitoba, Canada

Application July 12, 1950, Serial No. 173,397

1 Claim. (Cl. 236—12)

My invention pertains to water mixing valves, particularly to mixing valves for water closet tanks, an object of which is to provide a water mixing valve for water closet tanks of the character herewithin described, which will inject a predetermined proportion of hot water into the cold water conventionally discharged into the storage tanks installed in combination with water closets, or flush toilets.

Another object of my invention is to provide a device of the character herewithin described which will maintain the temperature of the water admitted into the tank at a temperature sufficiently high to prevent the formation of condensation on the tank outer surface.

Still another object of my invention is to provide a device of the character herewithin described which automatically controls the amount of hot water mixed with the normal cold water supply before the mixture is permitted to enter the tank.

A further object of my invention is to provide a device of the character herewithin described which includes means to prevent the flow of cold water into the hot water system and vice versa during the quiescent period when a hot or cold water outlet elsewhere in the system is operated.

Yet another object of my invention is to provide a device of the character herewithin described which is simple and economical to manufacture, install and maintain, and which is eminently well suited to the purpose for which it is intended.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
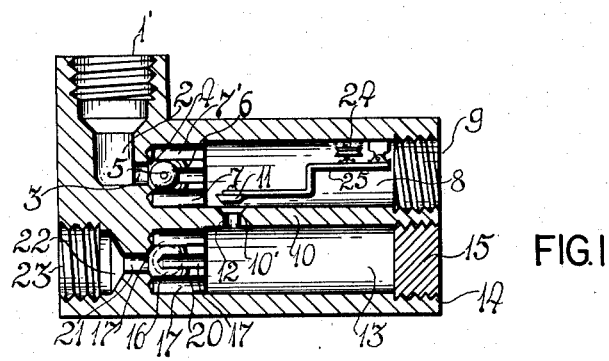
Figure 1 is a cross-sectional view, along the centre line of my mixing valve.
Figure 2:
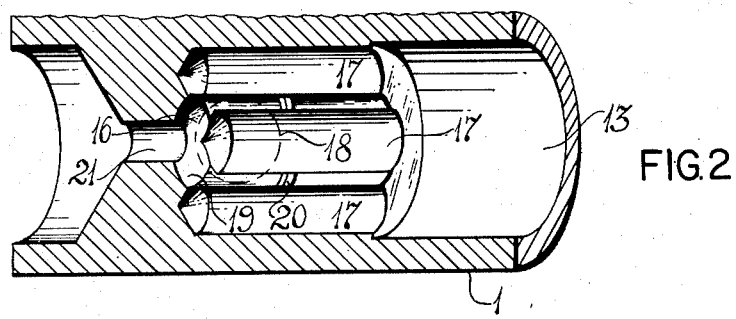
Figure 2 is an enlarged fragmentary perspective view of a portion of the hot water inlet.
Figure 3:
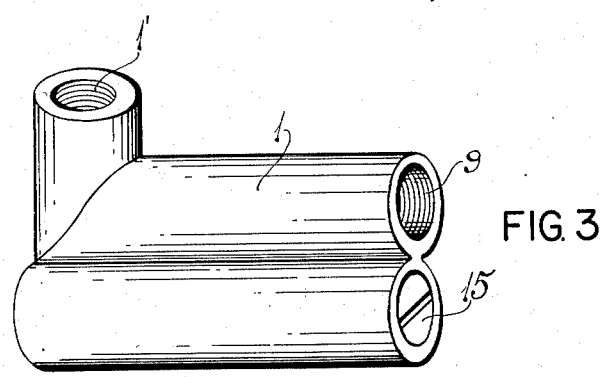
Figure 3 is a perspective view of my mixing valve.

In humid warm weather the presence of cold water within water closet tanks is a constant source of annoyance. The walls of the tank present a cold surface, well below the dew point of the ambient air. In consequence, the outer walls of said tank become well moistened by condensation, and the excess drips to the floor beneath the tank. This source of undesirable moisture can be controlled by controlling the temperature of the standing water supply in the tank at times of excessive humidity.

My mixing valve for water closet tanks described hereunder is intended to be installed with conventional water supply systems, and will eliminate condensation of such as is described hereinbefore.

Proceeding now to describe my invention in detail, it is to be understood that my mixing valve for water closet tanks is inserted in series with the inlet line of the said tank (not illustrated).

The valve comprises an outer casing collectively designated 1 having a female, screw-threaded cold water inlet 1' situated substantially at right angles thereto into which the cold water supply pipe (not illustrated) is fitted. At the end of a short cylindrical restriction 2, the inlet water is conducted through a 90 degree bend, and into a horizontally disposed, further restricted passage 3, which terminates in a ball seating 4, for floating check valve ball 5. A short cylindrical race 6, is provided for said ball 5, permitting same a limited amount of linear travel, sufficient to unseat said ball. The cold water is thus permitted to flow through the orifice thus opened, and over and around the ball. However, the pressure of water would close the orifice at the other end of the raceway 6, to which reference was made hereinabove, said terminus being provided by reclosing the short cylindrical race after ball 5 has been inserted. An expansion chamber 7 is provided for the purpose of obviating this possibility. Said chamber comprises in section, a quatrefoil configuration of counter-borings 7' symmetrically disposed about the aforementioned raceway 6, and of substantially smaller diameters, but arranged so that the circle through the centres of these said counter-borings is of a diameter the magnitude of which is slightly less than the sum of the respective diameters of the ball race 6 and one of the circumambient counter-borings. This provides a series of symmetrically disposed, axial breaches in the ball race wall, where the walls of the race 6 and the small surrounding counter-borings 7' coincide with each other. The inrushing cold water flowing around the unseated ball 5 is thus permitted to enter each of the four counter-bored passages 7.

The said four passages 7, open into a mixing chamber 8, which is a cylindrical chamber horizontally disposed within the upper portion of casing 1 with reference to the accompanying drawings, and substantially longer in diameter than the sections to which reference has previously been made herein. The discharge end or outlet 9 of this chamber is screw-threaded to receive a nipple or other similar connection to which connection may be made to the tank inlet.

In the lower, curved mixing chamber wall 10, a hot water injection port 10' is provided, fabricated to provide an effective conical seat for a valve 11, the purpose of which will hereinafter be described.

The said conical seating 10' terminates a short communicating passage 12 of circular section. This breaches the inner wall of a hot water expansion chamber 13, which is a drilling of substantially the same proportions as the mixing chamber 8, hereinabove described. Like the aforesaid chamber 8, it is provided with a pipe screw-threaded end 14. However, this end is sealed with a suitable un-permeable plug 15, the end of which may be slotted to permit of adequate sealing of the opening which is required to facilitate manufacture.

From the foregoing, it will be appreciated, that the two mixing chambers 8 and 13 are separated by the portion 10 which I designate as a partitioning wall.

Hot water is admitted to the aforesaid expansion chamber 13 through a quatrafoliated ball check valve, very similar to that hereinbefore described as part of the cold water inlet.

As hereinbefore described, a centrally disposed ball raceway 16 is longitudinally apertured in quadrature due to the intersection of the walls of the central raceway 16, with the cylindrical walls of the circumambient, cusped borings 17. Through these said borings, egress of water is possible when the ball valve 18 (shown in phantom for clarity) is forced from its seating 19. Sustained pressure forces the ball against the retaining shoulder 20 and water would be dammed thereby were it not for the cusped borings 17, to which reference was made above, and the associated longitudinal apertures. Hot water, then, enters the valve at the inlet end through a restricted passage 21, and the conical funnelling 22, at the end of the pipe screw-threaded inlet 23. Into this inlet, a conventional pipe connector makes the required communication with the existing hot water supply piping.

In order that only sufficient hot water is used to maintain the desired tank temperature above dew point, the quantity of hot water admitted is controlled. A bellows-type thermostatic element 24 is fitted on the inner wall of the mixing chamber 8, at a point remote from the hot water inlet port 10, thus ensuring that temperature response will depend upon the mixture of hot and cold water rather than either of the component streams.

Expansion or contraction of the aforesaid thermostatic element 24 is arranged to actuate a cantilever 25 which has its fulcrum in the hinge 26 by means of which it is secured to the inner wall of the mixing chamber, adjacent to the thermostat 24. The aforesaid cantilever is reverse angulated to bring the conical valve end 25 close to the conical seating 10 to which reference was made hereinabove. This said valve end is fixed to the cantilever at its lower end, and it is, therefore, controlled by thermometric response of the bimetallic element 24 to open or close, or take an intermediate position, the quantity of hot water being regulated thereby.

In the quiescent state, that is, when no water is flowing into the tank, reverse flow of the hot water from inlet 23 and into cold water inlet 1 would be possible whenever another cold water outlet within the system has opened. However, ball check valve 5 which seats against seat 4 prevents reverse flow of hot water, even if valve 11 is open as it would likely be when no water is flowing, if the temperature within the mixing chamber dropped below the predetermined dew point temperature. Likewise dilution of the hot water supply by cold water if another hot water outlet is opened is prevented by ball check valve 5.

In order to make use of my invention, it is merely necessary for an additional hot water supply pipe to be installed, and connected to the tank through the screw-threaded connection afforded in the inlet of my mixing valve. When the water closet tank demands recharging by the conventional valve opening, cold water enters after having passed through my valve. In so doing, however, the thermostat 24 causes unseating of valve 11 when the cold water from inlet ports 7 engulfs the said control. This action admits hot water through the corresponding restricted throat 12 and the core seating 10. This is carried into mixture with the inrushing cold water, thus raising the temperature thereof. This is maintained as long as the tank is being filled unless, in the interim, the temperature of the mixture rises beyond the point at which the thermostat is pre-set to trip the valve 11 and reseat it upon its valve seating 10. This, then, cuts off the supply of hot water and thus limits the rise in temperature preventing undue waste of hot water. Consequently, the walls of the water containing tank are at a temperature reasonably above dew point temperature, and the surfaces thereof do not present a condensing area, and the accumulation of moisture is eliminated.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

A mixing valve for water closet tanks and the like comprising in combination a casing, two parallel bores in said casing, a cold water supply inlet in said casing, a warm water supply inlet also within said casing, and a water outlet in said casing communicable with an associated water closet tank, one of said bores communicating between said cold water inlet and said water outlet, a communicating passage between said warm water inlet and said water outlet including the other of said bores and a port forming a junction between the bores at a point remote from said water outlet, a ball check valve in each of said bores situated between the junction thereof and each of said water inlets, an expansion chamber associated with each of said check valves, said expansion chambers including a plurality of concentrically disposed counterborings, portions of the walls of said counterborings coinciding with the wall of said bore thus providing a series of axial breaches, said counterborings and said boring having a quatrefoil, cross-sectional configuration, and thermostatic means to control the ingress of warm water, said thermostatic means including a thermostatic element situated within said casing adjacent said water outlet and remote from the junction of said bores, a cantilever actuated by said element, a valve seating upon one end of said cantilever adapted to control the influx of warm water to said one bore.

JOHN J. KELSCH.

References Cited in the file of this patent

UNITED STATES PATENTS

| Number | Name | Date |
|---|---|---|
| 1,032,352 | House | July 9, 1912 |
| 1,490,848 | Pettit | Apr. 15, 1924 |
| 1,989,949 | Boydston | Feb. 5, 1935 |
| 2,146,929 | Bassett | Feb. 14, 1939 |
| 2,159,819 | Snediker | May 23, 1939 |
| 2,245,967 | Dillon | June 17, 1941 |
| 2,296,135 | Batson | Sept. 15, 1942 |

FOREIGN PATENTS

| Number | Country | Date |
|---|---|---|
| 773,505 | France | Sept. 3, 1934 |